US012771611B2

(12) United States Patent
Barber et al.

(10) Patent No.: US 12,771,611 B2
(45) Date of Patent: Oct. 20, 2026

(54) AUTOMATED DISCOVERY OF NETWORK INVENTORY FROM RAW CONFIGURATION FILES USING MACHINE LEARNING

(71) Applicant: Ciena Corporation, Hanover, MD (US)

(72) Inventors: Christopher Barber, Ottawa (CA); Ashley Woods, Swindon (GB); Balaji Subramaniam, San Jose, CA (US); Sudhan Puranik, Pune (IN); Marc-Antoine Boutin, Ottawa (CA); David Cote, Gatineau (CA)

(73) Assignee: Ciena Corporation, Hanover, MD (US)

( * ) Notice: Subject to any disclaimer, the term of this patent is extended or adjusted under 35 U.S.C. 154(b) by 65 days.

(21) Appl. No.: 18/676,589

(22) Filed: May 29, 2024

(65) Prior Publication Data

US 2025/0323835 A1 Oct. 16, 2025

(30) Foreign Application Priority Data

Apr. 12, 2024 (IN) ............................. 202411029712

(51) Int. Cl.
*H04L 41/12* (2022.01)
*H04L 41/14* (2022.01)

(52) U.S. Cl.
CPC .............. *H04L 41/12* (2013.01); *H04L 41/14* (2013.01)

(58) Field of Classification Search
CPC ............ G06N 20/00; G06N 3/02; G06N 3/08; G06N 3/09; G06N 5/025; G06N 5/04; H04L 41/0893; H04L 41/12; H04L 41/14; H04L 41/142; H04L 41/145; H04L 41/16; H04L 43/08; H04L 63/1425
See application file for complete search history.

(56) References Cited

U.S. PATENT DOCUMENTS

2013/0246606 A1* 9/2013 Branch ............... H04L 41/0853 709/224
2019/0213248 A1* 7/2019 Gupta ................... G06F 40/232
2019/0324768 A1* 10/2019 Antonio .................. G06F 16/80
2024/0411994 A1* 12/2024 Siracusano ........... G06F 40/205
2025/0094619 A1* 3/2025 Pasumarthi ........... G06F 40/295
2025/0094707 A1* 3/2025 Portisch ................ G06F 40/284
2025/0252265 A1* 8/2025 Kotte ....................... G06F 40/35
2025/0284706 A1* 9/2025 Smith ................... G06F 16/258
2025/0291836 A1* 9/2025 Fatal ..................... G06F 16/383

* cited by examiner

*Primary Examiner* — Christopher Biagini
(74) *Attorney, Agent, or Firm* — Clements Bernard Walker; Christopher L. Bernard

(57) ABSTRACT

An automated network inventory discovery method, including: at a network inventory discovery engine coupled to a network data source, receiving unstructured network configuration data associated with a network element (NE); and, using a trained machine learning (ML) model, parsing named entity attributes from text of the unstructured network configuration data and mapping the named entity attributes to a common information model having a predetermined data structure. The trained ML model includes a trained named entity recognition (NER) model and/or a trained large language model (LLM). Alternatively, the trained ML model includes a trained NER model that is used to pre-process the text of the unstructured network configuration data prior to feeding resulting data into a trained LLM. The trained ML model serves the function of a custom parser script that is specific to one or more of the unstructured network configuration data or the network data source.

17 Claims, 6 Drawing Sheets

AUTOMATED DISCOVERY OF NETWORK INVENTORY FROM RAW CONFIGURATION FILES USING MACHINE LEARNING

CROSS-REFERENCE TO RELATED APPLICATION

The present disclosure claims the benefit of priority of co-pending Indian Patent Application number 202411029712, filed on Apr. 12, 2024, and entitled "Automated Discovery of Network Inventory From Raw Configuration Files Using Machine Learning," the contents of which are incorporated in full by reference.

TECHNICAL FIELD

The present disclosure relates generally to networking systems and methods. More particularly, the present disclosure relates to the automated discovery of network inventory from raw configuration files using machine learning (ML).

BACKGROUND

Various software, hardware, and firmware products are required to discover network resource and service layer information that may be spread across multiple domains and multiple layers and technologies to provide network automation, management, control, and analytics services. Such discovery requires collecting information from network elements (NEs) and mapping this information into an information model associated with the hardware or software product. The information is used to understand how a network is built, and also to understand how the network changes over time.

Obtaining the information typically requires parsing text-based configuration files of the network nodes. The challenge is that the configuration data is typically a collection of unstructured text fields, the format of which can vary by vendor and device type. Conventionally, parsing the data has required the manual creation of scripts, each of which must be hard-coded for a particular vendor or device type. The creation and maintenance of such scripts is very time consuming and is prone to error, potentially leading to inaccurate and/or incomplete network information. Even for a given device, software/firmware upgrades that introduce new features or updates to existing features can lead to changes in the configurations, which can disable the manually created parsing scripts. It is very resource consuming and expensive to build these parsing scripts, with the cost depending on the desired richness of the extracted data.

The present background is provided as environmental context only. It will be readily apparent to those of ordinary skill in the art that the principles and concepts of the present disclosure may be implemented in other environmental contexts equally, without limitation.

BRIEF SUMMARY

The present disclosure provides a method, non-transitory computer readable medium, and system utilizing a trained ML-based language model to automate the extraction and mapping of unstructured (or variously structured) network configuration data into a common information or data model. The ML-based language model may be a named entity recognition (NER) model, a large language model (LLM), or the like. The network configuration data may include, for example, vendor, model, name, serial number, shelf, slot, port, status, and description. This network configuration data is in JavaScript object notation (JSON) format, extensible markup language (XML) format, or any other file format and is obtained from each network device via an application programming interface (API) and a resource adapter (RA). The module of the present disclosure automatically assembles the relevant portions of this network configuration data into the common information or data model for subsequent assimilation and use to provide network automation, management, control, and analytics services. Thus, the use of time consuming and expensive individualized parser scripts is avoided, both initially and in the case of network device changes and modifications.

In one embodiment, the present disclosure provides an automated network inventory discovery method, including: at a network inventory discovery engine coupled to a network data source, receiving unstructured network configuration data associated with a network element (NE) of a network; and, using a trained ML model of the network inventory discovery engine, parsing named entity attributes from text of the unstructured network configuration data and mapping the named entity attributes to a common information model having a predetermined data structure. The named entity attributes are related to one or more of a network device or a network topology and include, for example, one or more of vendor, model, name, serial number, shelf, slot, port, status, or description. The network inventory discovery engine includes a non-transitory computer readable medium including instructions stored in a memory and executed by a processor of the network inventory discovery engine to carry out the automated network inventory discovery method. The unstructured network configuration data is received from the network data source by, for example, one of reading a log file to obtain the unstructured network configuration data, reading the unstructured network configuration data from a database, downloading the unstructured network configuration data from a file transfer protocol (FTP) server, or via an API and a RA coupled between the network inventory discovery engine and the network data source. The trained ML model includes a trained NER model. Alternatively, the trained ML model includes a trained LLM. Alternatively, the trained ML model includes a trained NER model that is used to pre-process the text of the unstructured network configuration data prior to feeding resulting data into a trained LLM. The trained NER model is used to categorize words in the text of the unstructured network configuration data and includes resulting categories in the text of the unstructured network configuration data prior to feeding the resulting data into the LLM. Alternatively or in addition, the trained NER model is used to remove parts from the text of the unstructured network configuration data prior to feeding the resulting data into the LLM. The automated network inventory discovery method further includes using the common information model to provide one or more of a network automation, management, control, or analytics service. The trained ML model serves the function of a custom parser script that is specific to one or more of the unstructured network configuration data or the network data source. In an alternative embodiment, the trained ML model (i.e., the LLM model) is adapted to itself generate a parser script for parsing the named entity attributes from the text of the unstructured network configuration data and mapping the named entity attributes to the common information model having the predetermined data structure.

In another embodiment, the present disclosure provides a non-transitory computer readable medium including instructions stored in a memory and executed by a processor of a network inventory discovery engine to carry out an automated network inventory discovery method, including: at the network inventory discovery engine coupled to a network data source, receiving unstructured network configuration data associated with a network element (NE) of a network; and, using a trained ML model of the network inventory discovery engine, parsing named entity attributes from text of the unstructured network configuration data and mapping the named entity attributes to a common information model having a predetermined data structure. The named entity attributes are related to one or more of a network device or a network topology and include, for example, one or more of vendor, model, name, serial number, shelf, slot, port, status, or description. The unstructured network configuration data is received from the network data source by, for example, one of reading a log file to obtain the unstructured network configuration data, reading the unstructured network configuration data from a database, downloading the unstructured network configuration data from a FTP server, or via an API and a RA coupled between the network inventory discovery engine and the network data source. The trained ML model includes a trained NER model. Alternatively, the trained ML model includes a trained LLM. Alternatively, the trained ML model includes a trained NER model that is used to pre-process the text of the unstructured network configuration data prior to feeding resulting data into a trained LLM. The trained NER model is used to categorize words in the text of the unstructured network configuration data and includes resulting categories in the text of the unstructured network configuration data prior to feeding the resulting data into the LLM. Alternatively or in addition, the trained NER model is used to remove parts from the text of the unstructured network configuration data prior to feeding the resulting data into the LLM.

In a further embodiment, the present disclosure provides an automated network inventory discovery system, including: a network inventory discovery engine coupled to a network data source and adapted to receive unstructured network configuration data associated with a network element (NE) of a network; and a trained ML model disposed in the network inventory discovery engine and adapted to parse named entity attributes from text of the unstructured network configuration data and map the named entity attributes to a common information model having a predetermined data structure; wherein the trained ML model includes one or more of a trained NER model and/or a trained LLM.

It will be readily apparent to those of ordinary skill in the art that aspects and features of each of the described embodiments may be incorporated, omitted, and/or combined as desired in a given application, without limitation.

BRIEF DESCRIPTION OF THE DRAWINGS

The present disclosure is illustrated and described with reference to the various drawings, in which like reference numbers are used to denote like system components/method steps, as appropriate, and in which.

It will be readily apparent to those of ordinary skill in the art that aspects and features of each of the illustrated embodiments may be incorporated, omitted, and/or combined as desired in a given application, without limitation.

DETAILED DESCRIPTION

Again, the present disclosure provides a method, non-transitory computer readable medium, and system utilizing a trained ML-based language model to automate the extraction and mapping of unstructured (or variously structured) network configuration data into a common information or data model. The ML-based language model may be a NER model, a LLM, or the like. The network configuration data may include, for example, vendor, model, name, serial number, shelf, slot, port, status, and description. This network configuration data is in JSON format, XML format, or any other file format and is obtained from each network device via an API and a RA. The module of the present disclosure automatically assembles the relevant portions of this network configuration data into the common information or data model for subsequent assimilation and use to provide network automation, management, control, and analytics services. Thus, the use of time consuming and expensive individualized parser scripts is avoided, both initially and in the case of network device changes and modifications. As an initial matter, it should be noted that, as used herein, "unstructured" refers to information or data that is not in a predetermined, known, or expected structure corresponding to that contemplated by a parser script or the common information or data model. Thus, "unstructured" configuration information or data may have a structure, but it may be individualized, NE-specific, and/or one of a variety of structures not adhering to a common or template structure.

Figure 1:
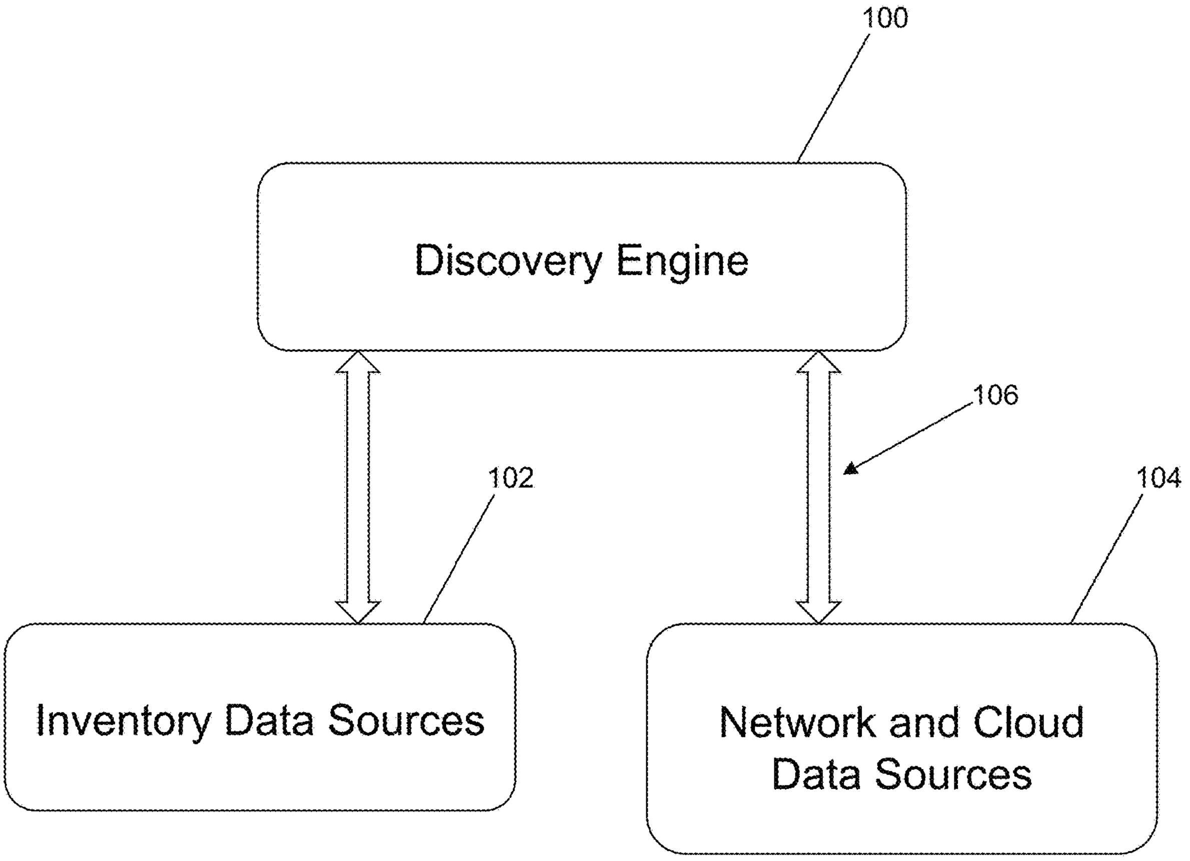
FIG. 1 is a schematic diagram illustrating one embodiment of the network discovery engine of the present disclosure and the interaction of the discovery engine with various network data sources.
Figure 2:
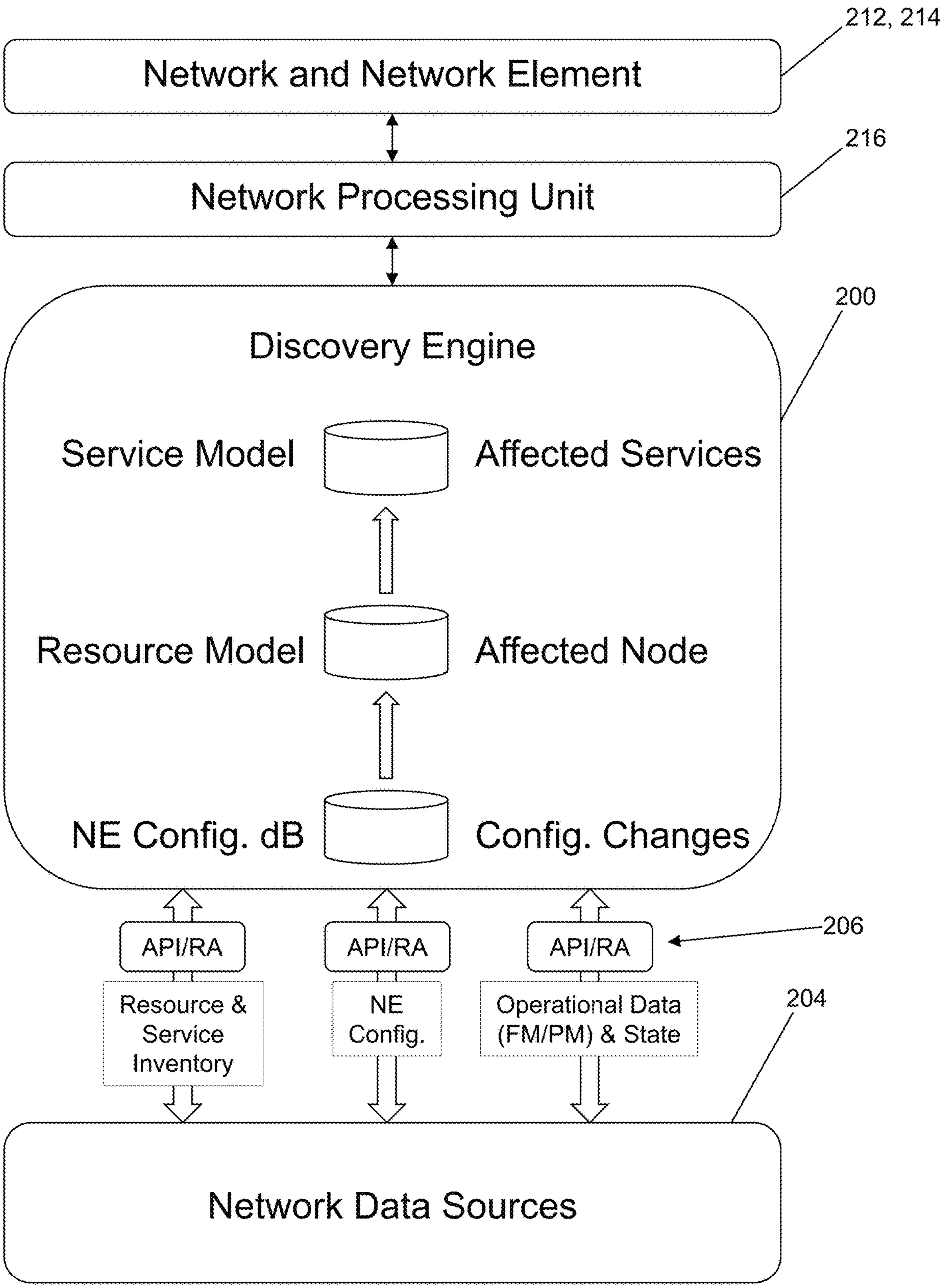
FIG. 2 is another schematic diagram illustrating one embodiment of the network discovery engine of the present disclosure and the interaction of the discovery engine with various network data sources.

FIGS. 1 and 2 are schematic diagrams illustrating one embodiment of the network discovery engine 100, 200 of the present disclosure and the interaction of the discovery engine 100, 200 with various inventory data sources 102 and network and cloud data sources 104, 204 via one or more APIs and RAs. The network discovery engine 100, 200 is adapted to parse the raw, unstructured network configuration data from the network and cloud data sources 104, 204 (i.e., the NEs or nodes) and distill the network configuration data into the common information or data model 308 (FIG. 3) desired in an automated manner using the trained ML model. Thus, the overall system can discover network resource and service layer information that is spread across multiple domains and multiple layers and technologies to provide network automation, management, control, and analytics services. The result is an understanding of how a network is built and how the network changes over time.

In general, the unstructured data that is parsed includes resource and service inventory information, NE configuration information, and operational data and state information. The discovery engine 100, 200 includes a NE configuration database (dB) that provides configuration and change analysis, a resource model that highlights an affected node, and a service model that highlights affected services.

Figure 3:
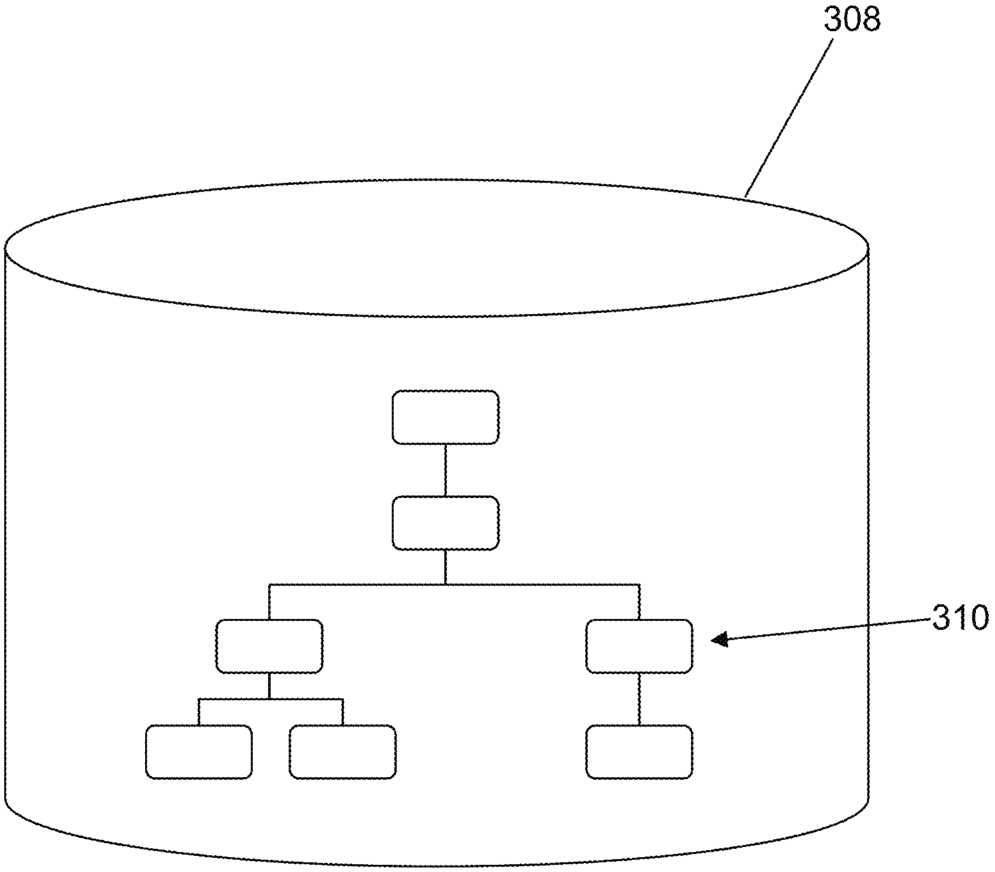
FIG. 3 is a schematic diagram illustrating one embodiment of the common information or data model of the present disclosure.

FIG. 3 is a schematic diagram illustrating one embodiment of the common information or data model 308 of the present disclosure, which includes parsed entity attributes 310. The ML model automatically extracts information from the unstructured documents by seeking and classifying named entities in the text into pre-defined categories. Thus, the ML model enables the automated extraction and mapping of the configuration data. Automation is possible because the entities and attributes are finite.

NER is a ML technique that can be used to extract information from unstructured documents by seeking and classifying named entities in text into pre-defined categories. General pre-trained models already exist which are very good at NER (e.g., NLTK, Spacy, and Stanford Core NLP), and these models can be fine tuned to a particular domain, such as telecommunications. Once extracted, the named entities can easily be mapped into a common data model for downstream ingestion by various products.

Another possible approach is to use a LLM to convert directly from the text in configuration files into a specific common data model format. This can be achieved with some prompting or, if needed, fine tuning of the LLM. LLMs have already been shown to be quite good at extracting information from text documents and transforming it into a desired format (e.g. JSON or CSV).

The two above approaches can be used in tandem, where the NER technique is used to pre-process the data prior to feeding it into the LLM. This can be done by using NER to categorize the words in the data, and include those categories in the text to help give the LLM additional context when translating the data into a common data model. NER can also be used to remove parts of the data which are not relevant to the common data model, which would improve the execution speed and accuracy of the LLM's response.

An alternative, indirect approach is to have the LLM write the parser scripts itself. In some cases this approach may be preferred, such as when the configuration data is very well structured and consistent. This approach may be cheaper than directly parsing the data with the LLM because LLM API providers generally charge a fee per token to use their LLM API, which can get expensive if parsing a large amount of data. It may also be faster since a dedicated script would require less compute power to parse the configuration files than an LLM. The potential disadvantage with this indirect method is that the model would not be able to generalize to new types of configuration data automatically-instead, the generated parser scripts would need to be kept up to date, requiring periodic re-generation. These scripts could automatically be kept up to date via a feedback loop, where if new data or new requirements come in, those can be added to the test suite, and the LLM can be used to automatically modify the code iteratively until all of the tests pass. Thus, this indirect method would require more manual effort in keeping the test cases complete and up to date, but would still be faster and cheaper than writing the parser scripts manually.

The network configuration data in the unstructured network configuration data of interest with respect the common data model may include, for example, vendor, model, name, serial number, shelf, slot, port, status, and description. Below is an example information model format for Internet service provider (ISP) network equipment, as well as example unstructured configuration data from a NE to be parsed:

Information Model—

```
{'NetworkElementName',
'SourceName',
'SerialNumber',
'CLEI',
'vendor',
'shelf',
'slot',
'port',
'status',
'description' }
```

Unstructured Configuration Data—

```
{
  "provisionedSpec": {
    "additionalAttributes": {
      "eqpWidth": "1",
      "equipmentProfile": "QPSK100G"
    },
    "hardwareVersion": "1",
    "serialNumber": "NTTMRT0CN99Y",
    "version": "004",
    "modelType": "WL3n",
    "partNumber": "NTK760MK",
    "type": "2x100G WL3n Enh C-band PKT/OTN I/F",
    "displayLabels": {
      "clei": "WOTRDP4FAA"
    },
    "manufacturer": "ALPHA"
  },
  "locations": [
    {
      "slot": "2",
      "shelf": "21",
      "neName": "E1-EDGE-171",
      "managementType": "tl1"
    }
  ],
  "resourceState": "discovered",
  "displayData": {
    "displayName": "PKTOTN-21-2",
    "displayState": "IS",
    "displayNameFormat": "type-sh-sl"
  },
  "state": "IS",
  "secondaryState": "ACT",
  "nativeName": "PKTOTN-21-2",
  "installedSpec": {
    "additionalAttributes": {
      "mdat": "2015-25",
      "epqWidth": "1"
    },
    "hardwareVersion": "1",
    "serialNumber": "NTTMRT0CN99Y",
    "version": "004",
    "modelType": "WL"
  }
}
```

Based on this information model and the unstructured configuration data, the resulting parsed information appears as follows:

```
{'NetworkElementName': 'E1-EDGE-171',
'SourceName': 'PKTOTN-21-2',
'SerialNumber': 'NTTMRT0CN99Y',
'CLEI': 'WOTRDP4FAA',
'vendor': 'CIENA',
```

-continued

'shelf': '21',
'slot': '2'.
'port': None,
'status': 'IS',
'description': '2x100G WL3n Enh C-band PKT/OTN I/F' }

It should be noted that the 'port' field is not provided in the configuration data, so it is set to 'None'. Thus, the response is correct and required no model training nor fine-tuning by using a pre-trained "vanilla" GPT4 model from OpenAI. The model understood that "neName" maps to "NetworkElementName", "displayName" maps to "sourceName", "manufacturer" maps to "vendor", and "state" maps to "status". It was also able to extract information from multiple levels of the input JSON, which demonstrates its ability to parse data from an unstructured (or at least only semi-structured) format. The model also did not produce a hallucination when there was no port information in the data. Instead, it set the 'port' value as 'None' and returned a warning message indicating that the port information could not be found.

Thus, the present disclosure uses a ML-based language model to automate the extraction of network configuration data from NEs on a network into a common data model format. In some embodiments, this can be achieved using one or more of the following techniques:

1) NER
   a) Using techniques to automatically extract named entities from unstructured network configuration files.
   b) Converting the extracted named entities into a common data format using a script.
2) Using LLM to both automatically extract and convert configuration data into a common data model directly. The data could be pre-processed using NER or other NLP techniques if needed prior to feeding into the LLM.
3) Using LLM to generate the code in the scripts that can be used to parse the network configuration files.

Conventionally, data extraction from network configuration files relies on manually written scripts that parse the configuration data and write it into a common data model. Writing and maintaining many parser scripts is time consuming, prone to error, and expensive. These scripts must be maintained and updated as new vendors or cards need to be supported, or when the configuration format changes (e.g., due to firmware updates).

The present disclosure addresses the above issues by leveraging pre-trained ML language models to perform the data extraction automatically. This technique removes the need for parser scripts and can automatically adapt to new, unseen configuration formats. This saves time and money by removing the need to manually write and maintain configuration parser scripts and removes the need to explicitly model individual network resources. It provides a more adaptable software and maintainable code base and improves the accuracy and completeness of extracted network data.

Figure 4:
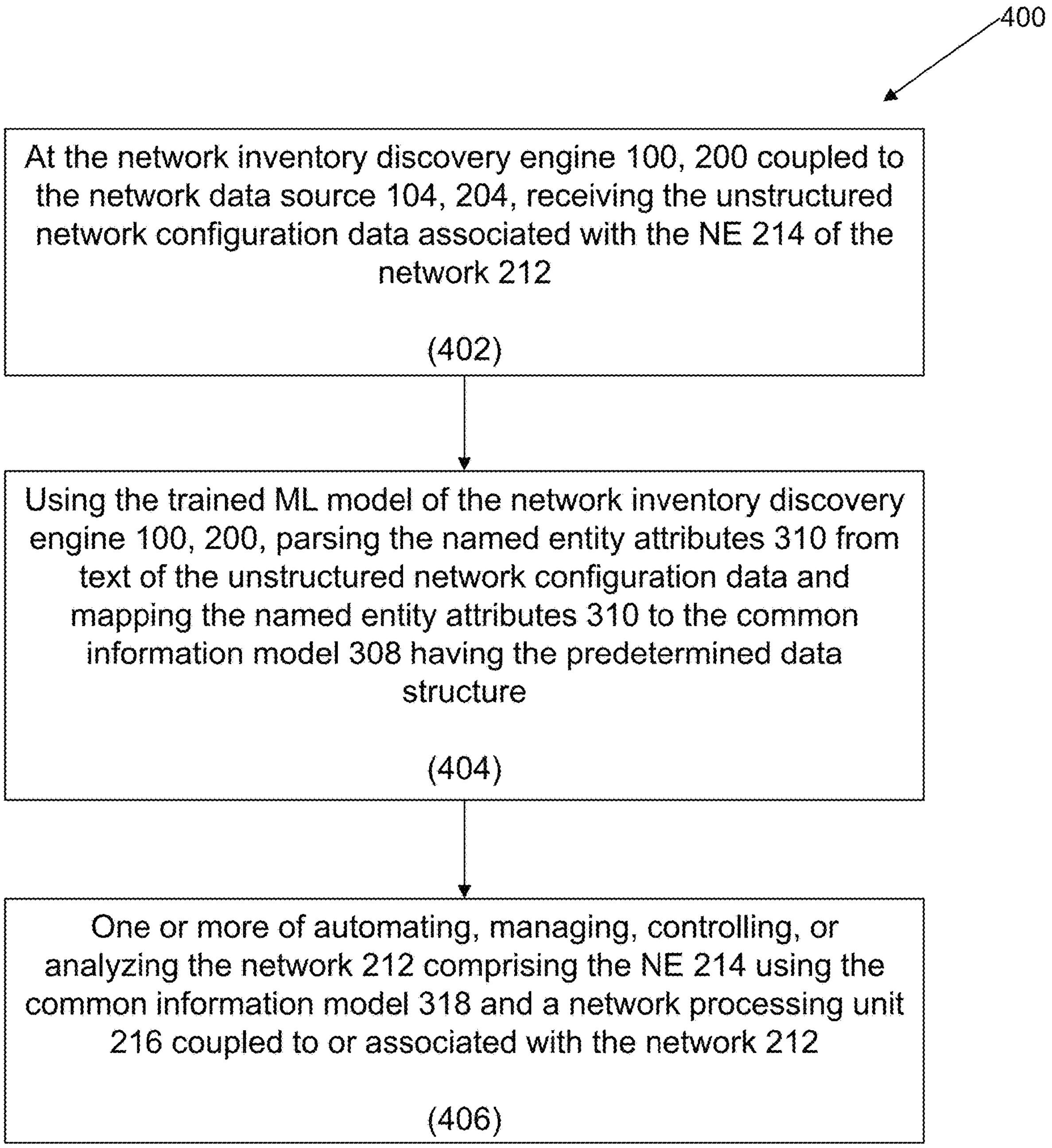
FIG. 4 is a flowchart illustrating one embodiment of the network discovery method of the present disclosure.

FIG. 4 is a flowchart illustrating one embodiment of the network discovery method 400 of the present disclosure. The network discovery method 400 generally includes, at the network inventory discovery engine 100, 200 coupled to the network data source 104, 204, receiving the unstructured network configuration data associated with the NE 214 of the network 212. (402). The network discovery method 400 also generally includes, using the trained ML model of the network inventory discovery engine 100, 200, parsing the named entity attributes 310 from text of the unstructured network configuration data and mapping the named entity attributes 310 to the common information model 308 having the predetermined data structure. (404). The network discovery method 400 further generally includes, one or more of automating, managing, controlling, or analyzing the network 212 comprising the NE 214 using the common information model 318 and a network processing unit 216 coupled to or associated with the network 212. (406).

Figure 5:
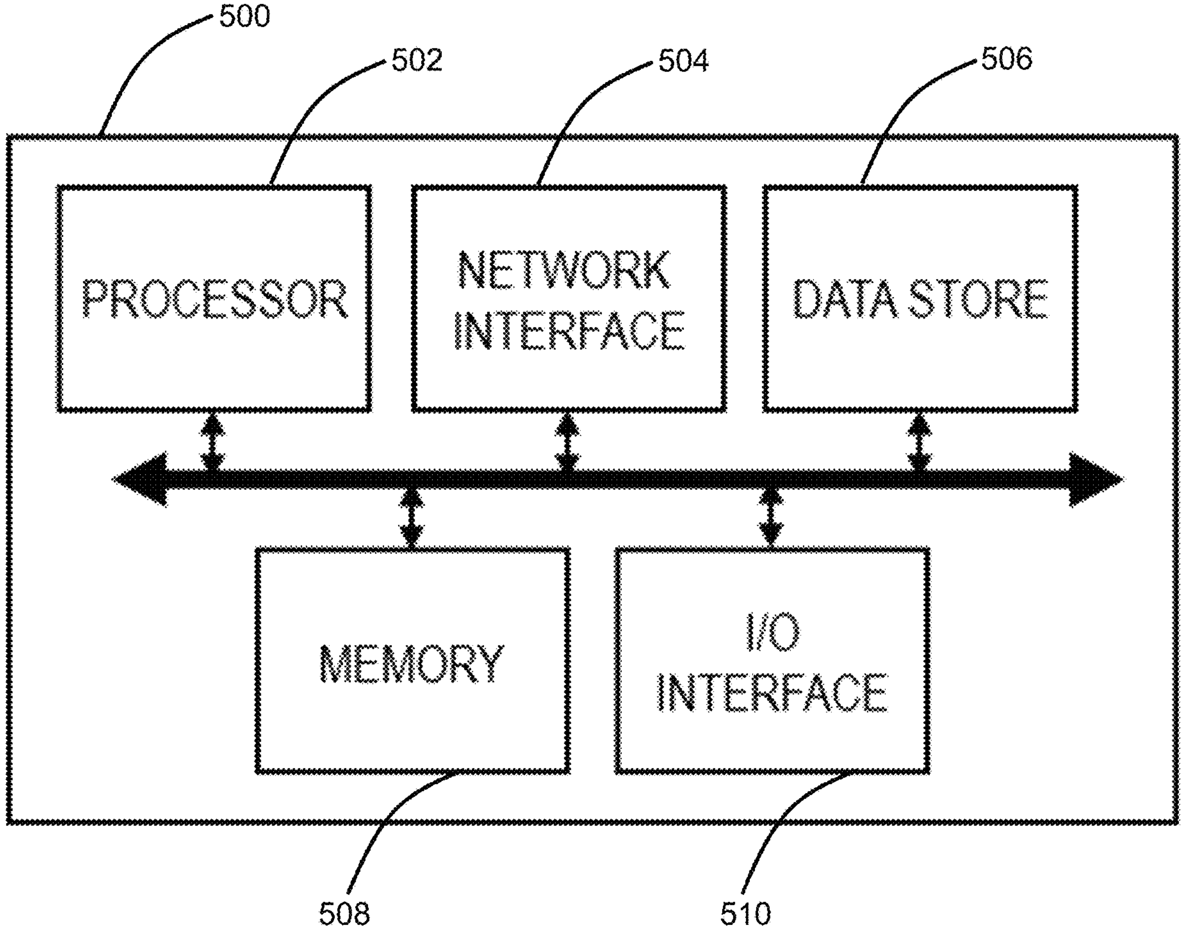
FIG. 5 is a schematic diagram of an example processing device used in conjunction with the automated network inventory discovery method and module of the present disclosure.

Referring to FIG. 5, it will be appreciated that some embodiments of the discovery engine 100, 200 described may include one or more generic or specialized processors 502 ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and/or the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic or circuitry. Of course, a combination of the aforementioned approaches may be used. For some of the embodiments described, a corresponding device in hardware and optionally with software, firmware, and/or a combination thereof can be referred to as "circuitry configured or adapted to," "logic configured or adapted to," etc. perform a set of operations, steps, methods, processes, algorithms, functions, techniques, etc. on digital and/or analog signals as described for the various embodiments.

Moreover, some embodiments may include a non-transitory computer readable medium having computer readable code or instructions stored thereon for programming a computer, server, appliance, device, processor, circuit, etc. each of which may include the processor 502 to perform functions as described and claimed. Examples of such computer-readable media include, but are not limited to, a hard disk, an optical storage device, a magnetic storage device, a read only memory (ROM), a programmable read only memory (PROM), an erasable programmable read only memory (EPROM), an electrically erasable programmable read only memory (EEPROM), flash memory, and/or the like. When stored in the non-transitory computer readable medium, software can include instructions executable by the processor or device 502 (e.g., any type of programmable circuitry or logic) that, in response to such execution, cause a processor or the device to perform a set of operations, steps, methods, processes, algorithms, functions, techniques, etc. as described for the various embodiments.

The discovery engine 100, 200 can include the processor 502 which is a hardware device for executing software instructions. The processor 502 can be any custom made or commercially available processor, a CPU, an auxiliary processor among several processors associated with the discovery engine 100, 200, a semiconductor-based microprocessor (in the form of a microchip or chipset), or generally any device for executing software instructions. When the discovery engine 100, 200 is in operation, the processor 502 is configured to execute software stored within the memory 508, to communicate data to and from the memory 508, and to generally control operations of the discovery engine 100, 200 pursuant to the software instructions. The discovery engine 100, 200 can also include a network interface 504, a data store 506, the memory 508, an input/output (I/O) interface 510, and the like, all of which are communicatively coupled to one another and to the processor 502.

The network interface 504 can be used to enable the discovery engine 100, 200 to communicate on a data communication network, such as to communicate to a management system and the like. The network interface 504 can include, for example, an Ethernet module. The network interface 504 can include address, control, and/or data connections to enable appropriate communications on the network. The data store 506 can be used to store data, such as control plane information, provisioning data, operations, administration, maintenance, and provisioning (OAM&P) data, etc. The data store 506 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 506 can incorporate electronic, magnetic, optical, and/or other types of storage media. The memory 508 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 508 may incorporate electronic, magnetic, optical, and/or other types of storage media. Note that the memory 508 can have a distributed architecture, where various components are situated remotely from one another, but may be accessed by the processor 502. The I/O interface 510 includes components for the discovery engine 100, 200 to communicate with other devices.

Figure 6:
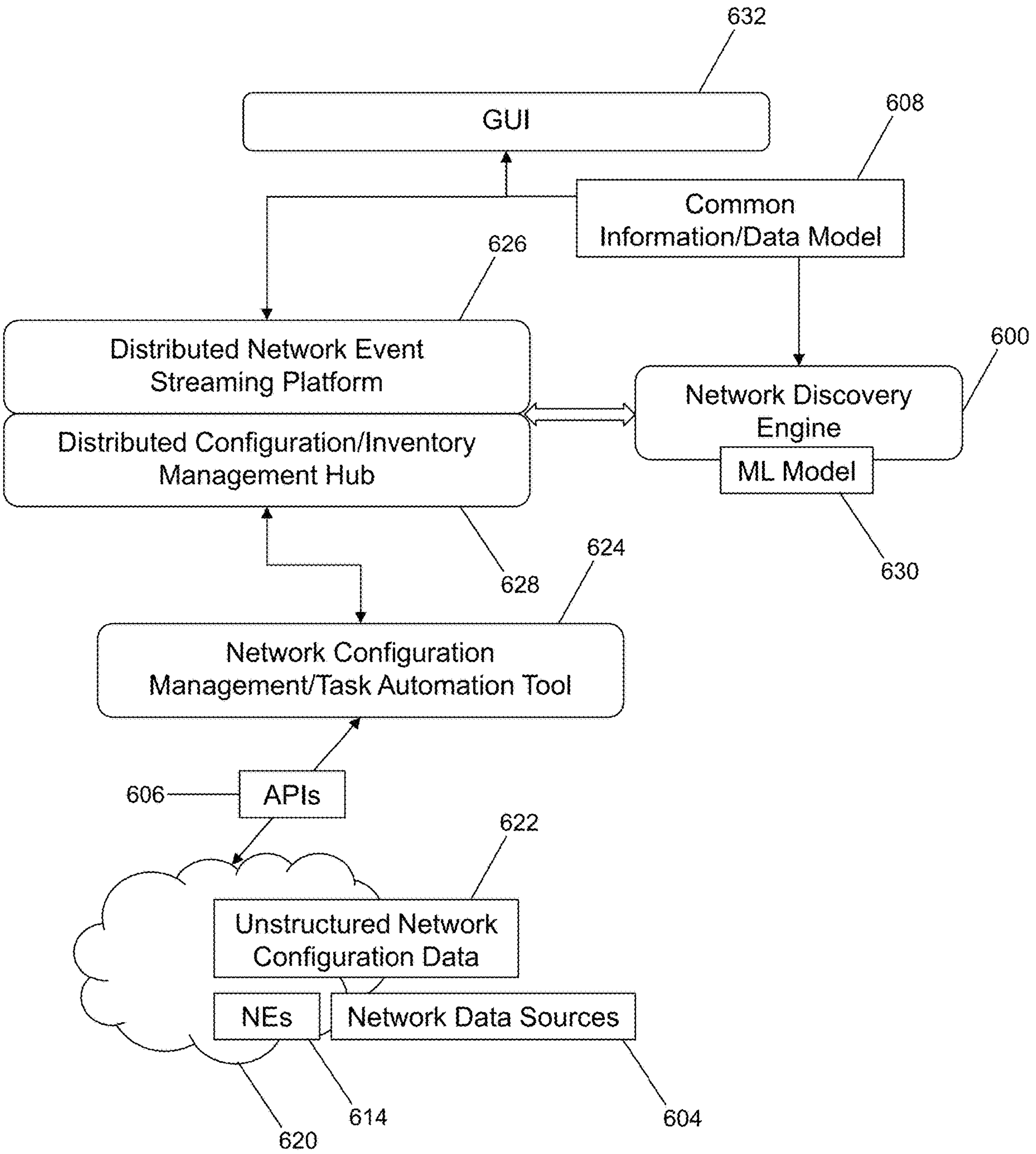
FIG. 6 is a schematic diagram illustrating one example of the use of the network discovery engine of the present disclosure and the interaction of the discovery engine with various network data sources.

FIG. 6 is a schematic diagram illustrating one example of the use of the network discovery engine 600 of the present disclosure and the interaction of the discovery engine 600 with various network data sources 604. As illustrated, the network 620 may be a multivendor network including network hardware devices 614, such as routers, switches, and firewalls manufactured by various companies and running various operating systems. The unstructured network configuration data 622 is obtained from these various NEs 614 and other network data sources 614 by a network configuration management/task automation tool 624 coupled to the various network nodes (i.e., servers or network devices) via the APIs 606 or the like. In general, the network configuration management/task automation tool 624 provides modules that allow interaction with the network devices by abstracting the complexity of interacting with the different devices and providing a consistent interface for tasks such as retrieving configurations, making changes, and/or gathering information. A distributed network event streaming platform 626 is typically used for building real time data pipelines and streaming applications. The network configuration management/task automation tool 624 can publish events related to configuration changes or updates to topics of the distributed network event streaming platform 626, allowing downstream systems to consume and process these events asynchronously. A distributed configuration/inventory management hub 628 serves as a central hub for managing configurations, inventory, repositories, playbooks, and version control. The backend orchestrates the configuration management workflow, handling tasks such as playbook execution and configuration drift detection and stores entire events and data in an associated database. The network discovery engine 600 is a holistic solution for simplifying the build, deployment, execution, and monitoring of various artificial intelligence (AI) applications, and is meant to be extensible via the distribution of applications as software development kits (SDKs) in addition to support to deploy them on standard installations. The network discovery engine 600 uses the raw configuration data 622 from the database and pre-processes data been fed to the ML model 630. As described above, the ML model 630 is a ML-based language model used to automate the extraction and mapping of the unstructured network configuration data 622 into the common information/data model 608. In this particular SDK, NER is used to extract information from the unstructured documents by seeking and classifying named entities in the text into pre-defined categories. Alternatively, a LLM can be used to convert directly from the text in into the common information/data model format. A graphical user interface (GUI) 632 is provided to allow administrators to receive desired output and interact with the configuration management system.

Although the present disclosure is illustrated and described with reference to specific embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An automated network inventory discovery method, comprising:

coupling a network configuration management/task automation tool to a device of a network element (NE) of a network to provide an interface for receiving unstructured network configuration data associated with the NE from the NE;

at a network inventory discovery engine coupled to a network data source, receiving the unstructured network configuration data through a distributed network event streaming platform and a distributed configuration/inventory management hub responsive to a device of the NE being initiated or modified, wherein the network configuration management/task automation tool publishes network configuration changes or updates to topics of the distributed network event streaming platform;

using a trained machine learning (ML) model of the network inventory discovery engine, parsing named entity attributes from text of the unstructured network configuration data without a parser script and mapping the named entity attributes to a common information model having a predetermined data structure, wherein the named entity attributes comprise at least device identifier information associated with the device of the NE; and one or more of automating, managing, controlling, or analyzing the network comprising the NE and the device of the NE that is initiated or modified using the common information model via a network configuration management system displaying an output on a graphical user interface that incorporates data in the common information model.

2. The automated network inventory discovery method of claim 1, wherein the named entity attributes are related to one or more of a network device or a network topology.

3. The automated network inventory discovery method of claim 1, wherein the network inventory discovery engine comprises a non-transitory computer readable medium comprising instructions stored in a memory and executed by a processor of the network inventory discovery engine to carry out the automated network inventory discovery method.

4. The automated network inventory discovery method of claim 1, wherein the unstructured network configuration data is received from the network data source by one of reading a log file to obtain the unstructured network configuration data, reading the unstructured network configuration data from a database, downloading the unstructured network configuration data from a file transfer protocol (FTP) server, or via an application programming interface (API) and a resource adapter (RA) coupled between the network inventory discovery engine and the network data source.

5. The automated network inventory discovery method of claim 1, wherein the trained ML model comprises a trained named entity recognition (NER) model.

6. The automated network inventory discovery method of claim 1, wherein the trained ML model comprises a trained large language model (LLM).

7. The automated network inventory discovery method of claim 1, wherein the trained ML model comprises a trained named entity recognition (NER) model that is used to pre-process the text of the unstructured network configuration data prior to feeding resulting data into a trained large language model (LLM).

8. The automated network inventory discovery method of claim 7, wherein the trained NER model is used to categorize words in the text of the unstructured network configuration data and includes resulting categories in the text of the unstructured network configuration data prior to feeding the resulting data into the LLM.

9. The automated network inventory discovery method of claim 7, wherein the trained NER model is used to remove parts from the text of the unstructured network configuration data prior to feeding the resulting data into the LLM.

10. A non-transitory computer readable medium comprising instructions stored in a memory and executed by a processor of a network inventory discovery engine to carry out an automated network inventory discovery method, comprising:

coupling a network configuration management/task automation tool to a device of a network element (NE) of a network to provide an interface for receiving unstructured network configuration data associated with the NE from the NE;

at a network inventory discovery engine coupled to a network data source, receiving the unstructured network configuration data through a distributed network event streaming platform and a distributed configuration/inventory management hub responsive to a device of the NE being initiated or modified, wherein the network configuration management/task automation tool publishes network configuration changes or updates to topics of the distributed network event streaming platform;

using a trained machine learning (ML) model of the network inventory discovery engine, parsing named entity attributes from text of the unstructured network configuration data without a parser script and mapping the named entity attributes to a common information model having a predetermined data structure, wherein the named entity attributes comprise at least device identifier information associated with the device of the NE; and one or more of automating, managing, controlling, or analyzing the network comprising the NE and the device of the NE that is initiated or modified using the common information model via a network configuration management system displaying an output on a graphical user interface that incorporates data in the common information model.

11. The non-transitory computer readable medium of claim 10, wherein the named entity attributes are related to one or more of a network device or a network topology.

12. The non-transitory computer readable medium of claim 10, wherein the unstructured network configuration data is received from the network data source by one of reading a log file to obtain the unstructured network configuration data, reading the unstructured network configuration data from a database, downloading the unstructured network configuration data from a file transfer protocol (FTP) server, or via an application programming interface (API) and a resource adapter (RA) coupled between the network inventory discovery engine and the network data source.

13. The non-transitory computer readable medium of claim 10, wherein the trained ML model comprises a trained named entity recognition (NER) model.

14. The non-transitory computer readable medium of claim 10, wherein the trained ML model comprises a trained large language model (LLM).

15. The non-transitory computer readable medium of claim 10, wherein the trained ML model comprises a trained named entity recognition (NER) model that is used to pre-process the text of the unstructured network configuration data prior to feeding resulting data into a trained large language model (LLM).

16. The non-transitory computer readable medium of claim 15, wherein the trained NER model is used to categorize words in the text of the unstructured network configuration data and includes resulting categories in the text of the unstructured network configuration data prior to feeding the resulting data into the LLM.

17. The non-transitory computer readable medium of claim 15, wherein the trained NER model is used to remove parts from the text of the unstructured network configuration data prior to feeding the resulting data into the LLM.

* * * * *